(12) United States Patent
Winston et al.

(10) Patent No.: US 7,121,152 B2
(45) Date of Patent: Oct. 17, 2006

(54) PORTABLE FLOW MEASUREMENT APPARATUS HAVING AN ARRAY OF SENSORS

(75) Inventors: Charles R. Winston, Glastonbury, CT (US); Michael A. Sapack, Southbury, CT (US); Patrick Curry, Glastonbury, CT (US); Daniel L. Gysling, Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/862,234

(22) Filed: Jun. 7, 2004

(65) Prior Publication Data

US 2005/0005713 A1    Jan. 13, 2005

Related U.S. Application Data

(60) Provisional application No. 60/476,437, filed on Jun. 6, 2003.

(51) Int. Cl.
*G01F 1/34* (2006.01)

(52) U.S. Cl. .................................. 73/861.42
(58) Field of Classification Search ............ 73/861.42, 73/861.44, 861.08
See application file for complete search history.

(56) References Cited

U.S. PATENT DOCUMENTS

| | | | |
|---|---|---|---|
| 2,874,568 A | 2/1959 | Petermann ............... | 73/861.02 |
| 4,004,461 A | 1/1977 | Lynnworth ............... | 73/861.27 |
| 4,048,853 A | 9/1977 | Smith et al. ............. | 73/861.25 |
| 4,080,837 A | 3/1978 | Alexander et al. ........ | 73/61.45 |
| 4,195,517 A | 4/1980 | Kalinoski et al. ........ | 73/461.27 |
| 4,248,085 A | 2/1981 | Coulthard ............... | 73/861.06 |
| 4,445,389 A | 5/1984 | Potzick et al. ........... | 73/861.27 |
| 4,860,590 A | 8/1989 | Buck et al. | |
| 4,896,540 A | 1/1990 | Shakkottai et al. ...... | 73/861.02 |
| 5,040,415 A | 8/1991 | Barkhoudarian ......... | 73/861.03 |
| 5,083,452 A | 1/1992 | Hope ....................... | 73/61 R |

(Continued)

FOREIGN PATENT DOCUMENTS

GB    2294137    4/1996

(Continued)

OTHER PUBLICATIONS

Sonar-Based Volumetric Flow Meter for Pulp and Paper Applications—By: Daniel L. Gysling & Douglas H. Loose—Dec. 3, 2002.

(Continued)

*Primary Examiner*—Harshad Patel

(57) ABSTRACT

A portable flow measuring apparatus measures the speed of sound and/or vortical disturbances propagating in a fluid flow to determine a parameter of the flow propagating through a pipe. The apparatus includes a sensing device that includes an array of pressure sensors, which may be removable, used to measure the acoustic and convective pressure variations in the flow to determine a desired parameter. A portable processing instrument processes the signals provided by the sensing array to provide an output signal indicative of a parameter of the fluid flow. The portable processing instrument includes a processor having appropriate processing algorithms to determine the desired or selected parameter(s) of the process flow 12. The portable processing instrument has a user interface to permit the user to select the parameters to be measured in the process flow, and/or more importantly, to enable the user to modify particular parameters or functions in the processor 30 and/or processing algorithms. The user interface 32 also enables a user to modify the code of the algorithm via a graphic user interface (GUI), keyboard and/or user input signal 34.

19 Claims, 9 Drawing Sheets

U.S. PATENT DOCUMENTS

| | | | |
|---|---|---|---|
| 5,218,197 A | 6/1993 | Carroll | 250/227.19 |
| 5,285,675 A | 2/1994 | Colgate et al. | 73/23.2 |
| 5,367,911 A | 11/1994 | Jewell et al. | 73/861.08 |
| 5,398,542 A | 3/1995 | Vasbinder | 73/40.5 |
| 5,524,475 A | 6/1996 | Kolpak et al. | 73/19.03 |
| 5,526,844 A | 6/1996 | Kamen et al. | 137/614.11 |
| 5,550,537 A * | 8/1996 | Perdue | 340/870.01 |
| 5,591,922 A | 1/1997 | Segeral et al. | 73/861.04 |
| 5,741,980 A | 4/1998 | Hill et al. | 73/861.04 |
| 5,770,805 A | 6/1998 | Castel | 73/861.04 |
| 5,770,806 A | 6/1998 | Hiismaki | 73/861.29 |
| 5,835,884 A | 11/1998 | Brown | 73/861.04 |
| 5,845,033 A | 12/1998 | Berthold et al. | 385/12 |
| 5,856,622 A | 1/1999 | Yamamoto et al. | 73/861.28 |
| 5,948,959 A | 9/1999 | Peloquin | 73/1.83 |
| 6,151,958 A | 11/2000 | Letton et al. | 73/61.79 |
| 6,202,494 B1 | 3/2001 | Riebel et al. | 73/861.29 |
| 6,354,147 B1 * | 3/2002 | Gysling et al. | 73/61.79 |
| 6,378,357 B1 | 4/2002 | Han et al. | 73/54.41 |
| 6,397,683 B1 | 6/2002 | Hagenmeyer et al. | 73/861.18 |
| 6,435,030 B1 | 8/2002 | Gysling et al. | |
| 6,443,226 B1 | 9/2002 | Diener et al. | |
| 6,450,037 B1 | 9/2002 | Davis et al. | |
| 6,463,813 B1 | 10/2002 | Gysling et al. | |
| 6,532,827 B1 | 3/2003 | Ohnishi | 73/861.27 |
| 6,536,291 B1 | 3/2003 | Gysling et al. | |
| 6,550,342 B1 | 4/2003 | Croteau et al. | |
| 6,558,036 B1 | 5/2003 | Davis et al. | |
| 6,587,798 B1 | 7/2003 | Gysling et al. | |
| 6,601,458 B1 | 8/2003 | Gysling et al. | |
| 6,691,584 B1 * | 2/2004 | Gysling et al. | 73/861.42 |
| 6,698,297 B1 | 3/2004 | Gysling | |
| 6,782,150 B1 | 8/2004 | Davis et al. | |
| 6,813,962 B1 | 11/2004 | Gysling et al. | |
| 6,837,098 B1 | 1/2005 | Gysling et al. | |
| 6,868,737 B1 | 3/2005 | Croteau et al. | |
| 6,889,562 B1 | 5/2005 | Gysling et al. | |
| 6,898,541 B1 | 5/2005 | Gysling et al. | |
| 6,959,604 B1 | 11/2005 | Davis et al. | |
| 6,971,259 B1 | 12/2005 | Gysling | |
| 7,013,240 B1 | 3/2006 | Vipin | |
| 7,032,432 B1 | 4/2006 | Gysling et al. | |
| 2002/0095263 A1 | 7/2002 | Gysling et al. | |
| 2002/0194932 A1 | 12/2002 | Gysling et al. | |
| 2003/0089161 A1 | 5/2003 | Gysling | |
| 2003/0136186 A1 | 7/2003 | Gysling | |
| 2003/0154036 A1 | 8/2003 | Gysling et al. | |
| 2004/0069069 A1 | 4/2004 | Croteau | |
| 2004/0144182 A1 | 7/2004 | Gysling et al. | |
| 2004/0167735 A1 | 8/2004 | Gysling et al. | |
| 2004/0168522 A1 | 9/2004 | Bailey et al. | |
| 2004/0168523 A1 | 9/2004 | Bailey et al. | |
| 2004/0194539 A1 | 10/2004 | Gysling | |
| 2004/0199340 A1 | 10/2004 | Gysling et al. | |
| 2004/0199341 A1 | 10/2004 | Gysling et al. | |
| 2004/0200260 A1 * | 10/2004 | Klosterman et al. | 73/1.74 |
| 2004/0210404 A1 | 10/2004 | Gysling et al. | |
| 2004/0226386 A1 | 11/2004 | Croteau et al. | |
| 2004/0231431 A1 | 11/2004 | Bailey et al. | |
| 2004/0255695 A1 | 12/2004 | Gysling et al. | |
| 2005/0005912 A1 | 1/2005 | Gysling et al. | |

FOREIGN PATENT DOCUMENTS

| | | |
|---|---|---|
| WO | WO 93/14382 | 7/1993 |
| WO | WO 99/067629 | 12/1999 |
| WO | WO 00/060317 | 10/2000 |
| WO | WO 01/002810 | 1/2001 |

OTHER PUBLICATIONS

Sonar Based Volumetric Flow Meter for Chemical and Petrochemical Applications—By: Daniel L. Gysling & Douglas H. Loose—Feb. 14, 2003.

Sonar Based Volumetric Flow and Entrained Air Measurement for Pulp and Paper Applications—By: Daniel L. Gysling & Douglas H. Loose—Jan. 24, 2003.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

\* cited by examiner

US 7,121,152 B2

PORTABLE FLOW MEASUREMENT APPARATUS HAVING AN ARRAY OF SENSORS

CROSS-REFERENCE TO RELATED PATENT APPLICATIONS

The present invention claims the benefit of U.S. Provisional Patent Application, Ser. No. 60/476,437 filed Jun. 6, 2003, which is incorporated herein by reference.

TECHNICAL FIELD

This invention relates to an apparatus for measuring a parameter of a process flow passing within a pipe, and more particularly to a portable instrument for selectively portable flow measurement system and/or instrument having or interconnecting with an array of sensors for processing data signals therefrom to provide an output indicative of a parameter of a process flow passing through a pipe.

BACKGROUND ART

In industrial flow processing system, there are many different types of pipes, pipe configurations, fluids flowing within the pipes and other conditions that provide a challenge to many industrial process flow meters to operate within a desired specification. In the development of a flow measuring device for an industrial process, it is desirable to test a measuring device in the field under real world conditions to evaluate and develop ones product to meet a customers needs under different conditions. This is also desirable to determine and evaluate the limitation of a particular flow measuring device. While installing a meter on each desired application and various locations is possible. The installation of the meters may be cost prohibitive or time prohibitive. Further, the installation may require the process to be shutdown for a period of time, which may undesirable for particular industrial plants or processes. Once the measuring apparatus is installed, the diagnostic and development system to interrogate and modify the functionality of the meter may be cumbersome and difficult to bring out into the field. These issues limit the ability to test and develop a flow measuring product in the field or at different locations within a flow system.

In many instances, it is desirable to measure or characterize the fluid flow within a pipe or at various pipe locations within an industrial process system. However, the need to measure the flow at particular locations may be for a short period time to understand the flow conditions or troubleshoot a problem in the process flow system. It would be very cost prohibitive to install flow measuring devices at each of the desired locations for a short period of time. Further, if the flow measuring devices has difficulty measuring the desired parameter at the pipe location, the user is unable to modify the parameters, function or code of the device to enable the device to function properly.

It would be advantageous to have portable flow measuring device that can easily be mounted to the outer surface of the pipe and be easily removed to enable the flow measuring device to be easily moved to different pipe locations. Further, it would be advantageous for the processing algorithms to be modified in the field to enable the measuring device to function under different flow conditions.

SUMMARY OF THE INVENTION

Objects of the present invention include providing a portable flow measuring apparatus for measuring the speed of sound or vortical disturbances propagating through a fluid flowing in pipes in industrial processes and other related processes, for example, to determine a parameter of the process flow.

According to the present invention, a portable flow measurement device is provided for measuring a parameter of a process flow flowing within a pipe. The device comprises at least two pressure sensor, wherein the pressure sensors provide respective pressure signals indicative of the unsteady pressure within the pipe. A portable processing instrument, responsive to said pressure signals, provides an output signal indicative of the at least one parameter of the mixture flowing through the pipe. The portable processing instrument enables a user to modify the operation of the portable flow measurement device.

The foregoing and other objects, features and advantages of the present invention will become more apparent in light of the following detailed description of exemplary embodiments thereof.

BEST MODE FOR CARRYING OUT THE INVENTION

Figure 1:
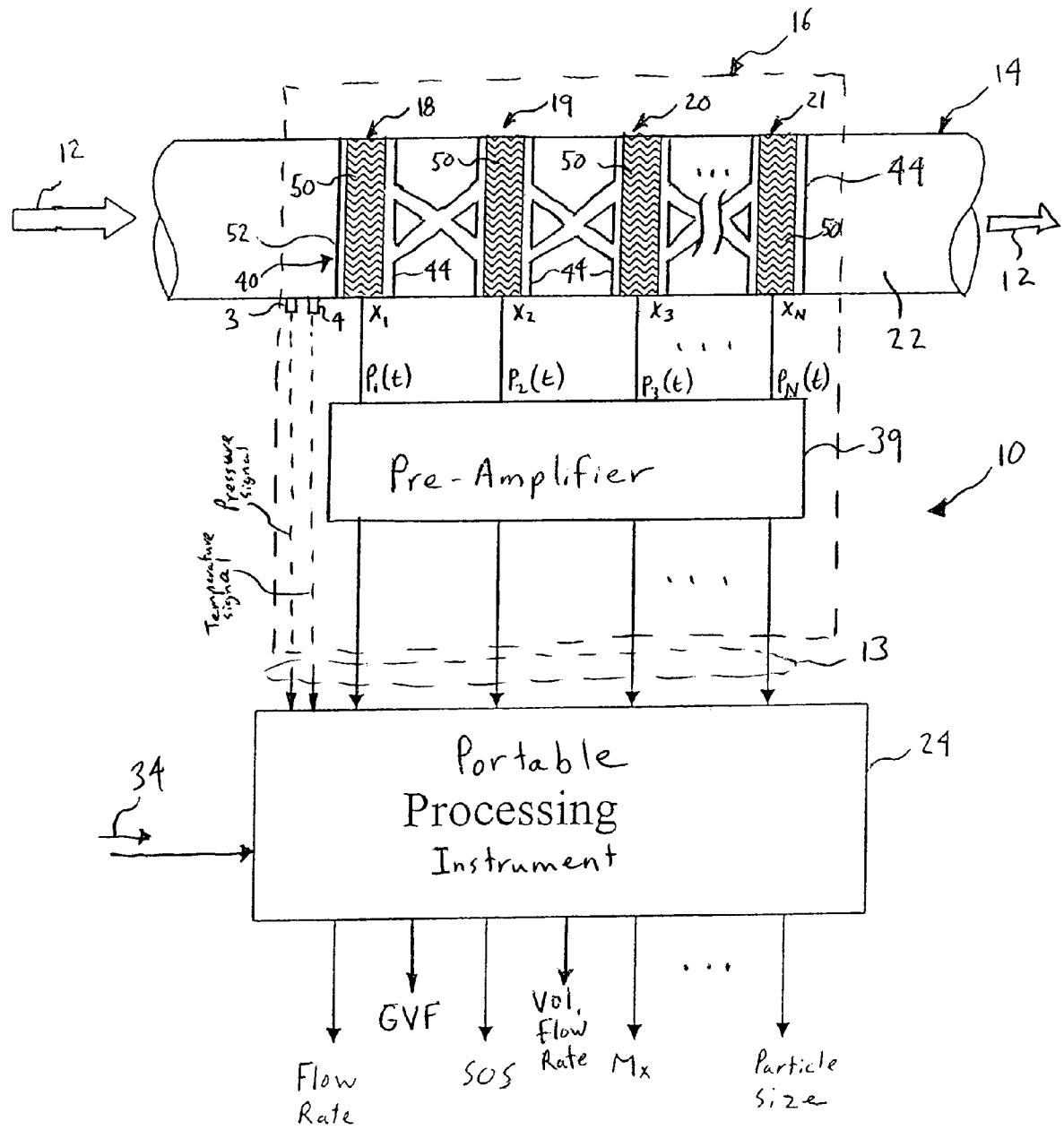
FIG. 1 is a schematic diagram of a portable flow measurement system having a portable processing instrument and an array of sensors.

FIG. 1 illustrates a schematic diagram of a portable flow measurement apparatus 10 that includes a sensing device (sensor head) 16 mounted to the pipe 14 and a portable processing instrument 24. The portable apparatus 10 measures a characteristic or parameter of a single phase fluid (e.g., gas and liquid) and/or multiphase fluids (e.g., gas/liquid mixtures, liquid/solid mixtures, gas/solid mixtures, steam, pulp and paper slurries, aerated gas and liquids and mixtures) 12 flowing through a pipe 14. Specifically, the characteristics and parameters determined include the volumetric flow of the fluid, the consistency or composition of the fluid, the density of the fluid, the Mach number of the fluid, the size of particle flowing through the fluid, the air/mass ratio of the fluid, velocity of the flow, volumetric flow rate, gas volume fraction of the flow, and/or the percentage of entrained air within a liquid or slurry.

For instance, the apparatus 10, in accordance with the present invention, can determine the speed at which sound propagates through the fluid flow 12 within a pipe 14 to measure particular characteristics of the single or multi-phase fluids. The apparatus may also determine the speed at which vortical disturbances or turbulent eddies 188 (see FIG. 5) propagate through the pipe 14 to determine the velocity of the fluid flow 12. To simplify the explanation of the present invention, the flow propagating through the pipe will be referred to as a process flow with the understanding that the fluid or process flow 12 may be a single phase or multi-phase flow, as described hereinbefore.

The sensing device 16 comprises an array of strain-based or pressure sensors 18–21 for measuring the unsteady pressures produced by vortical disturbances within the pipe, which are indicative of the velocity of the process flow 12. The pressure signals $P_1(t)$–$P_N(t)$ are provided to the portable processing unit 24, which digitizes the pressure signals and computes the appropriate flow parameter(s). A cable 13 electronically connects the sensing device 16 to the portable processing instrument 24. The analog pressure sensor signals $P_1(t)$–$P_N(t)$ are typically 4–20 mA current loop signals.

The array of pressure sensors comprises an array of at least two pressure sensors 18,19 spaced axially along the outer surface 22 of a pipe 14, having a process flow propagating therein. The pressure sensors 18–21 are removably mounted to the pipe by any releasable fastener, such as bolts, screws and clamps. The array of sensors of the sensing device 16 may include any number of pressure sensors 18–21 greater than two sensors, such as three, four, eight, sixteen and N number of sensors between two and sixteen sensors. Generally, the accuracy of the measurement improves as the number of sensors in the array increases. The pressure sensors 18–19 measure the unsteady pressures produced by acoustical and/or vortical disturbances within the pipe 14, which are indicative of the SOS propagating through the fluid flow 12 in the pipe and the velocity of the mixture 12, respectively. The output signals ($P_1(t)$–$P_N(t)$) of the pressure sensors 18–21 are provided to a pre-amplifier unit 39 that amplifies the signals generated by the pressure sensors 18–21. The portable processing instrument 24 processes the pressure measurement data $P_1(t)$–$P_N(t)$ and determines the desired parameters and characteristics of the flow 12, as described hereinbefore.

Figure 2:
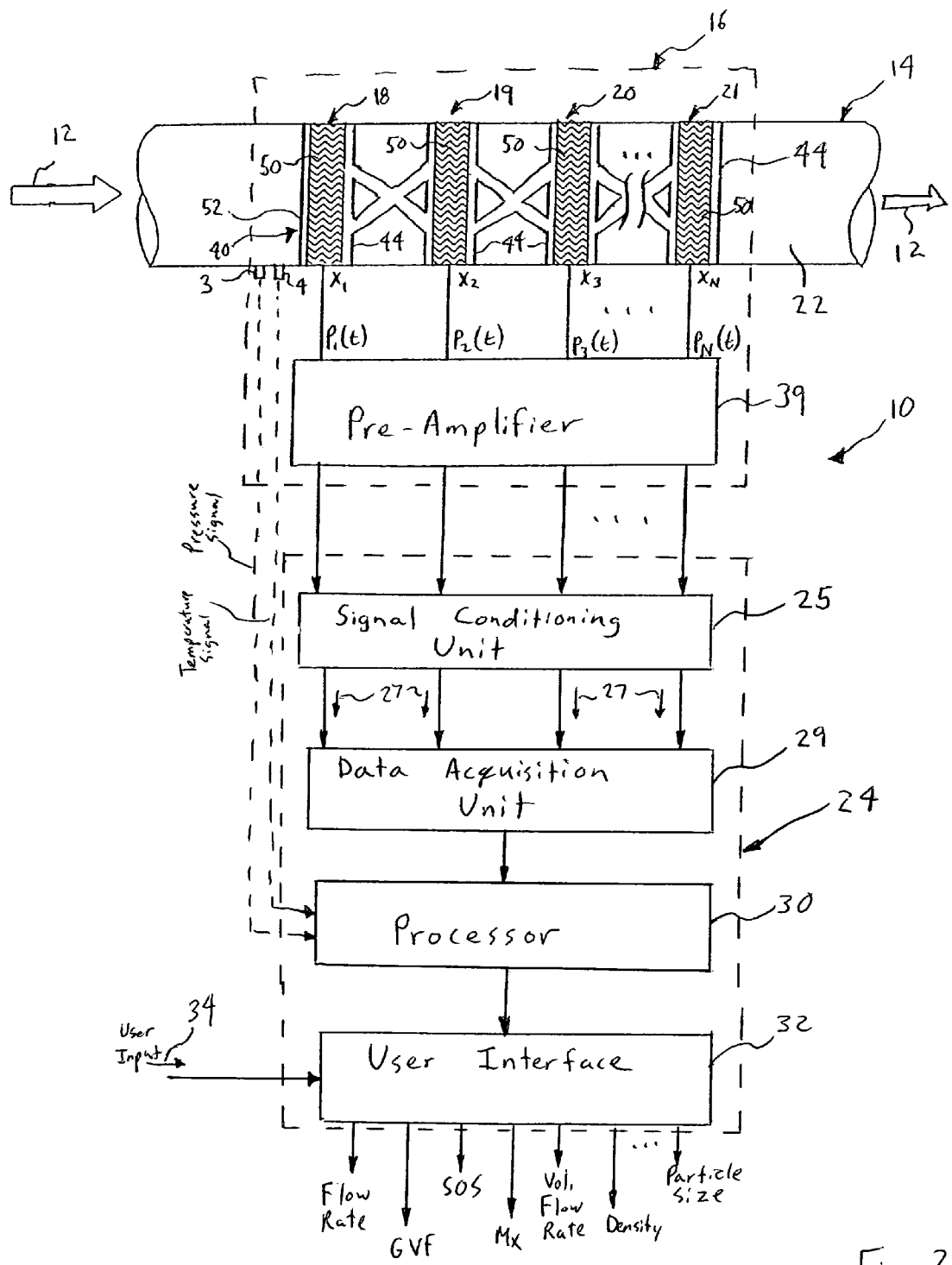
FIG. 2 is a schematic diagram of a portable flow measurement system having a portable processing instrument and an array of sensors including a expanded schematic diagram of the portable processing instrument.

Referring to FIG. 2, the portable processing instrument 24 includes a signal conditioner 25, which provides appropriate gain and filtering in preparation for digitization of the sensor signals. The signal conditioning unit 25 also provides power to charge amplifiers. A data acquisition unit 29 includes an analog to digital converter (A/D converter) for digitizing the conditioned sensor signals 27, which are provided to the processor 30. The processor 30 includes appropriate processing algorithms to determine the desired or selected parameter(s) of the process flow 12, which will be described in greater detail hereinafter.

The portable processing instrument 24 includes a user interface 32 to provide a means for the user to select the parameters to be measured in the process flow, and/or more importantly, to enable the user to modify particular parameters or functions in the processor 30 and/or processing algorithms. The user interface 32 also enables a user to modify the code of the algorithm via a graphic user interface (GUI), keyboard and/or user input signal 34. For instance, the user may change the operational flow range (e.g., change to 3–30 ft/sec), the frequency range over which algorithm calculates the slope for of a convective or acoustic ridge in the k-ω plane (see FIGS. 7 and 9), the amount of data accumulated for flow rate calculation, levels for acceptable readings (i.e., quality factor metrics), self diagnostic features, and data correction for special circumstances (e.g., high altitude for gas volume fraction calculation). The user interface may even allow a user to post process data collected and stored b the portable processing instrument 24.

While the data acquisition unit 29, the processor 30 and the user interface 32 is shown as separate units, one will appreciate that these units may be combined into a single unit, such as a laptop computer. The laptop computer may operate using an operating system such as Windows XP®, a high-level technical computing language and interactive development environment such as MatLab®, and a graphic user interface (GUI). The laptop computer runs the appropriate application program to acquire the pressure sensor signals $P_1(t)$–$P_N(t)$ and apply signal processing algorithms to the data to compute the appropriate flow parameters, including flow velocity, volumetric flow, speed of sound of the medium and interpretation of sound speed into compositional parameters. The portable processing instrument 24 may be located as far away from the sensing device 12 as 200 feet.

The signal conditioning unit 25 for the portable instrument 24 has a filter board containing current sense resistors for the current loop input signals, as well as high and low pass filters for AC coupling and anti-alias filtering. The outputs 27 of the filter board are sent to the data acquisition unit 29 located in one of the PCMCIA slots of the laptop computer for example. The portable instrument 24 also includes a power supply that is provided to the sensing device 16. The gain of the filters may be set to 1, 2, 4 and 8. The data acquisition card has a 16-Bit A/D and a sample rate of up to 25 KHz per channel, which meet the National specs for National Instruments DAQCard 6036E.

The laptop computer 29,30,32 may be a Dell Lattitude C640, Inspiron 4150 or equivalent having a Pentium 4, 2.0 GHz or higher processor. The laptop computer may also include an internal 10/100 network connection or an internal 56K modem to transmit data or receive commands from a remote location (e.g., external from the laptop computer) via the user input signal, for example. Software loaded onto the computer may include Mathworks Matlab with data acquisition toolbox and signal processing toolbox. Also, National Instruments NIDAQ Version 6.9.2 or higher software may be loaded into the computer. A processing algorithm and GUI are also loaded onto the laptop computer for processing the input data from the array of sensors 18–21 of the sensing device 16 to provide the desired output to the user indicative of a parameter of the process flow 12 propagating through the pipe 14.

The combined portable instrument 24 and the sensing device 16 function as flow meter similar to that described in U.S. patent application, Ser. No. 10/007,749 filed Nov. 7, 2001; U.S. patent application, Ser. No. 10/007,736 filed Nov. 8, 2001; U.S. patent application Ser. No. 09/729,994, filed Dec. 4, 2000; U.S. patent application, Ser. No. 10/349,716 filed Jan. 23, 2003; U.S. patent application, Ser. No. 10/376, 427 filed Feb. 26, 2003; U.S. Provisional Patent Application, Ser No 60/425,436 Nov. 12, 2002; and U.S. Provisional Patent Application, Ser. No. 60/451,685 filed Mar. 4, 2003, which are all incorporated herein by reference. The portable instrument 24 can effectively function as a transmitter unit 36, which are permanently installed.

The portable features of the processing instrument 24 and the removability of the sensing device 16 enables the portable flow measurement apparatus 10 to function in a number of different ways. For instance, the portable apparatus 10 may be used as demonstration unit that may be transported from plant to plant or location to location within an industrial plant to demonstrate the capabilities of a similar flow device having an array of sensors. Further, the portable flow measurement apparatus 10 may be used to determine the robustness and capabilities of new applications for similar array based meter. The utility of the portable apparatus is further enhanced by the user interface that provides the capability to modify various parameters of the algorithms and functions programmed into the processor 30. The user interface even allows a user to modify the algorithms at the desired test location. This capability provides a very powerful tool to troubleshoot the technology (or meter) in the field, as well as provide develop of the product in the field with the flexibility to move the portable measurement apparatus 10 to a desired location or pipe 14. Specifically, the portable measurement apparatus 10 may be used as a development tool by enabling a user to temporarily mount the sensor array to a pipe and use the portable instrument 10 to measure the desired parameter of the flow in the pipe. The GUI enables a user to diagnose, change parameters in the processing algorithm and vary parameters conditioning of the input signals.

The portable flow measurement apparatus 10 may also be used to troubleshoot and/or optimize an industrial flow process. The features of the present invention allow one or more portable apparatus 10 to be located on desired process pipes for a specific period of time to measure and characterized the process flow 12 in the respective pipes 14. After a desired time period, the portable apparatus 10 may be moved to other locations to further characterize and trouble shoot the process system. The configurability and reprogramming and modification of the operating parameters also allows the portable apparatus 10 to function on any number of pipes having various types of fluid flow 12 flowing therein without having a specific apparatus for each location. The present invention allows the fluid flowing within a pipe to be measured and characterized when it is not economically feasible to permanently install measurement devices at all the desired locations to troubleshoot or characterize a process.

Figure 3:
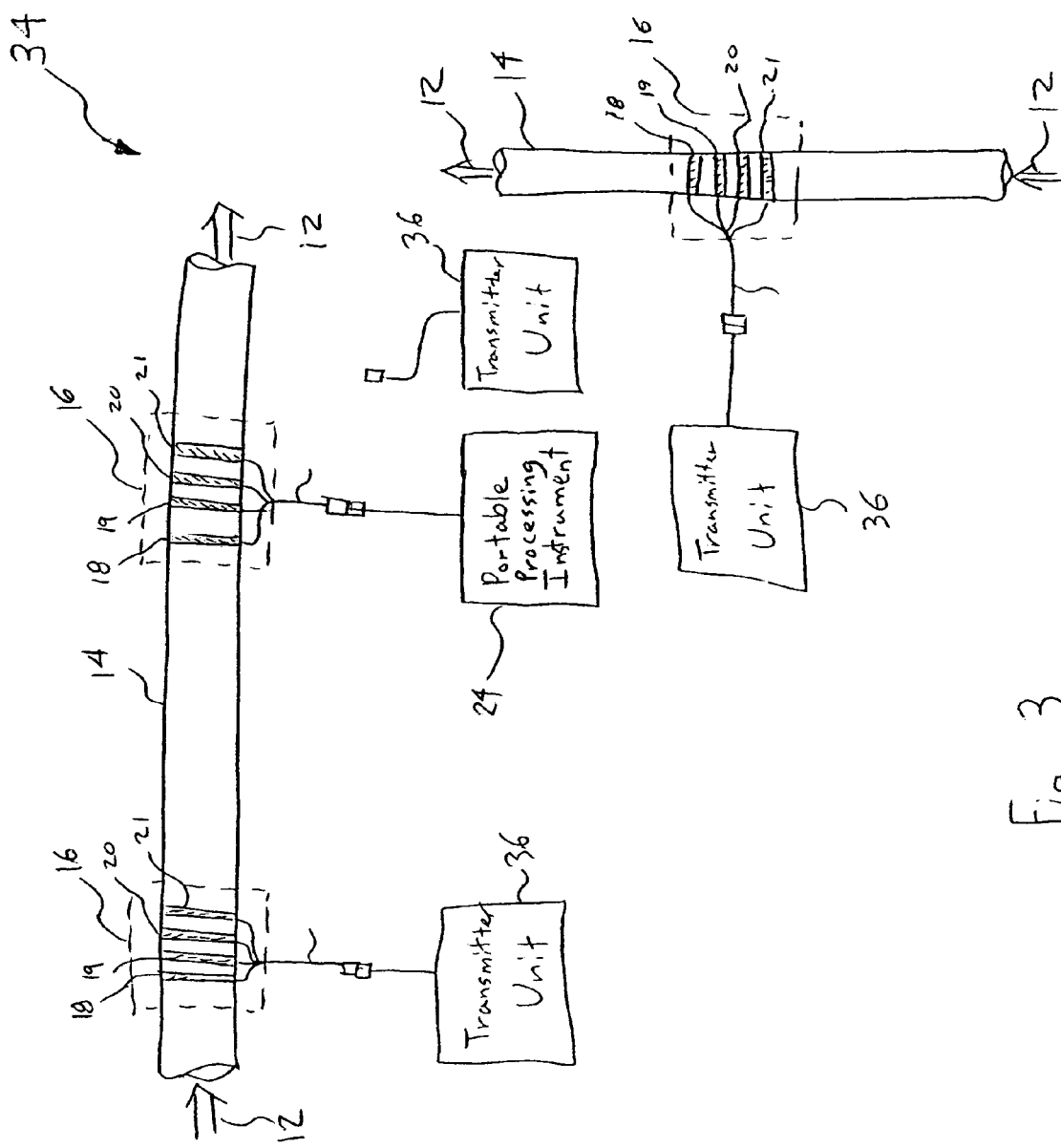
FIG. 3 is a schematic diagram of a processing plant having a plurality of pipes with a number of sensors heads and respective transmitter units mount thereto to measure desired parameters and a portable processing instrument interconnected to one of the sensor heads, in accordance with the present invention.

FIG. 3 illustrates another capability of the present invention. In Fig. a processing plant 34 is shown having a plurality of pipes 16 with a number of sensors heads 12 and respective processing units (or transmitters) 36 mount thereto to measure desired parameters. The portable processing instrument 24 may be used as a troubleshooting instrument to help identify problems with the sensing unit 16 or transmitter 36 by disconnecting a transmitter unit 36 and temporarily substitute the portable processing instrument 24. It is conceivable that a plant 34 or location may simply have a plurality of sensing units mounted to pipes throughout the plant and having no transmitters for some or all of the sensing units 16. In this instance, the portable unit 24 may be used to pole or selectively process the data from a desired sensing unit to thereby provide flow data on an intermittent or scheduled basis. One will appreciate that the sensors 18–21 may be permanently or otherwise non-removably mounted to the pipes in this embodiment. For example, the pressure sensors may be ported within a spool piece or section of pipe 14.

As suggested and further described in greater detail hereinafter, the apparatus 10 has the ability to measure the speed of sound (SOS) and flow rate (or velocity) using one or both of the following techniques described herein below:
 1) Determining the speed of sound of acoustical disturbances or sound waves propagating through the flow 12 using the array of pressure sensors 18–21, and/or
 2) Determining the velocity of vortical disturbances or "eddies" propagating through the flow 12 using the array of pressure sensors 18–21.

Generally, the first technique measures unsteady pressures created by acoustical disturbances propagating through the flow 12 to determine the speed of sound (SOS) propagating through the flow. Knowing the pressure and/or temperature of the flow and the speed of sound of the acoustical disturbances, the processing unit 24 can determine determined include the volumetric flow of the fluid, the consistency or composition of the fluid, the density of the fluid, the Mach number of the fluid, the size of particle flowing through the fluid, the air/mass ratio of the fluid, and/or the percentage of entrained air within a liquid or slurry, such as that described in U.S. patent application Ser. No. 10/349, 716, filed Jan. 23, 2003, U.S. patent application Ser. No. 10/376,427, filed Feb. 26, 2003, U.S. patent application Ser. No. 10/762,410, filed Jan. 21, 2004, which are all incorporated by reference.

Figure 5:
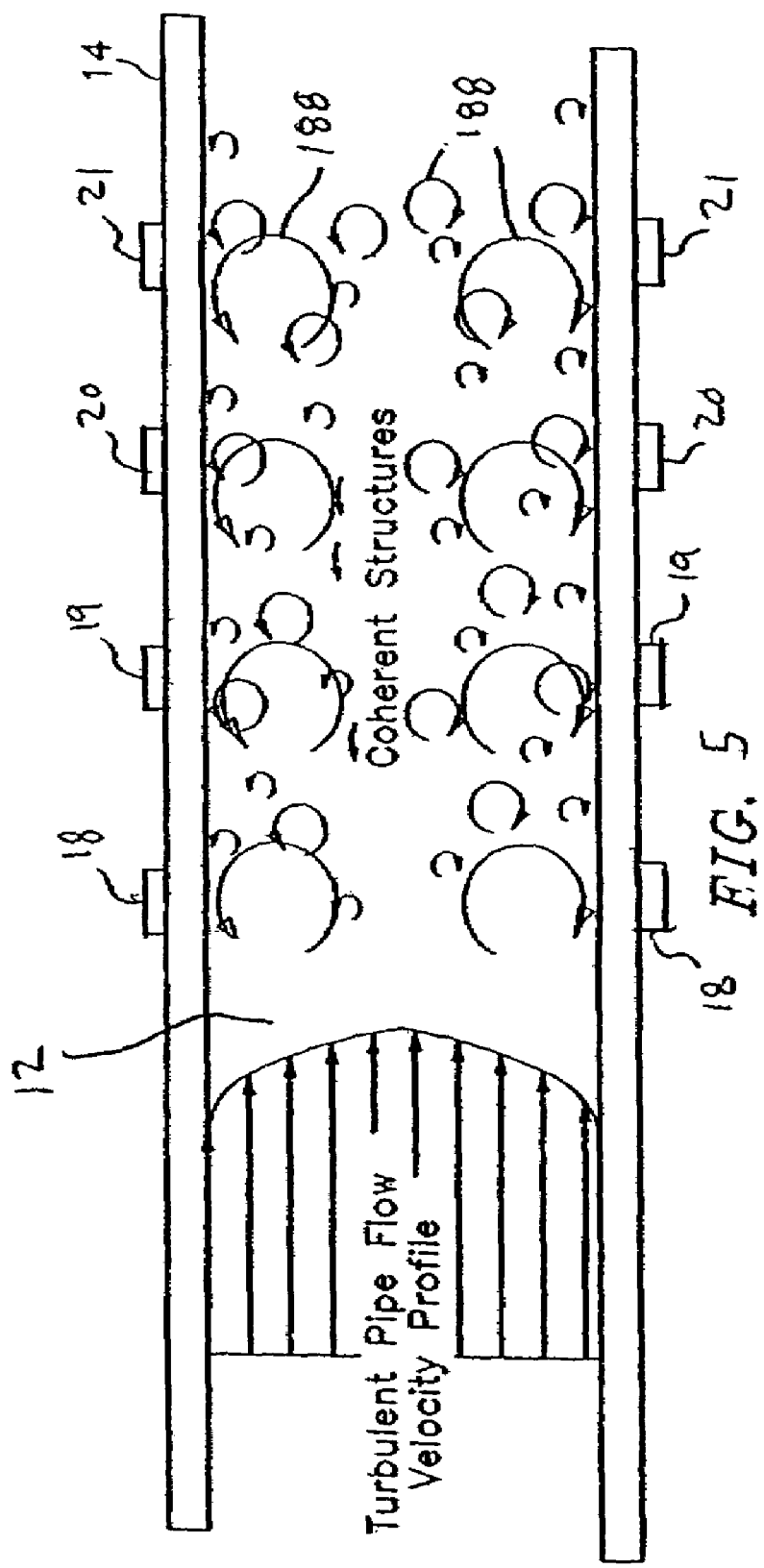
FIG. 5 is a cross-sectional view of a pipe having a turbulent pipe flowing having coherent structures therein, in accordance with the present invention.

The second technique measures the velocities associated with unsteady flow fields and/or pressure disturbances created by vortical disturbances or "eddies" 118 (see FIG. 5) to determine the velocity of the flow 12. The pressure sensors 18–21 measure the unsteady pressures $P_1$–$P_N$ created by the vortical disturbances as these disturbances convect within the flow 12 through the pipe 14 in a known manner, as shown in FIG. 5. Therefore, the velocity of these vortical disturbances is related to the velocity of the flow 12 and hence the volumetric flow rate may be determined, as will be described in greater detail hereinafter.

Figure 4:
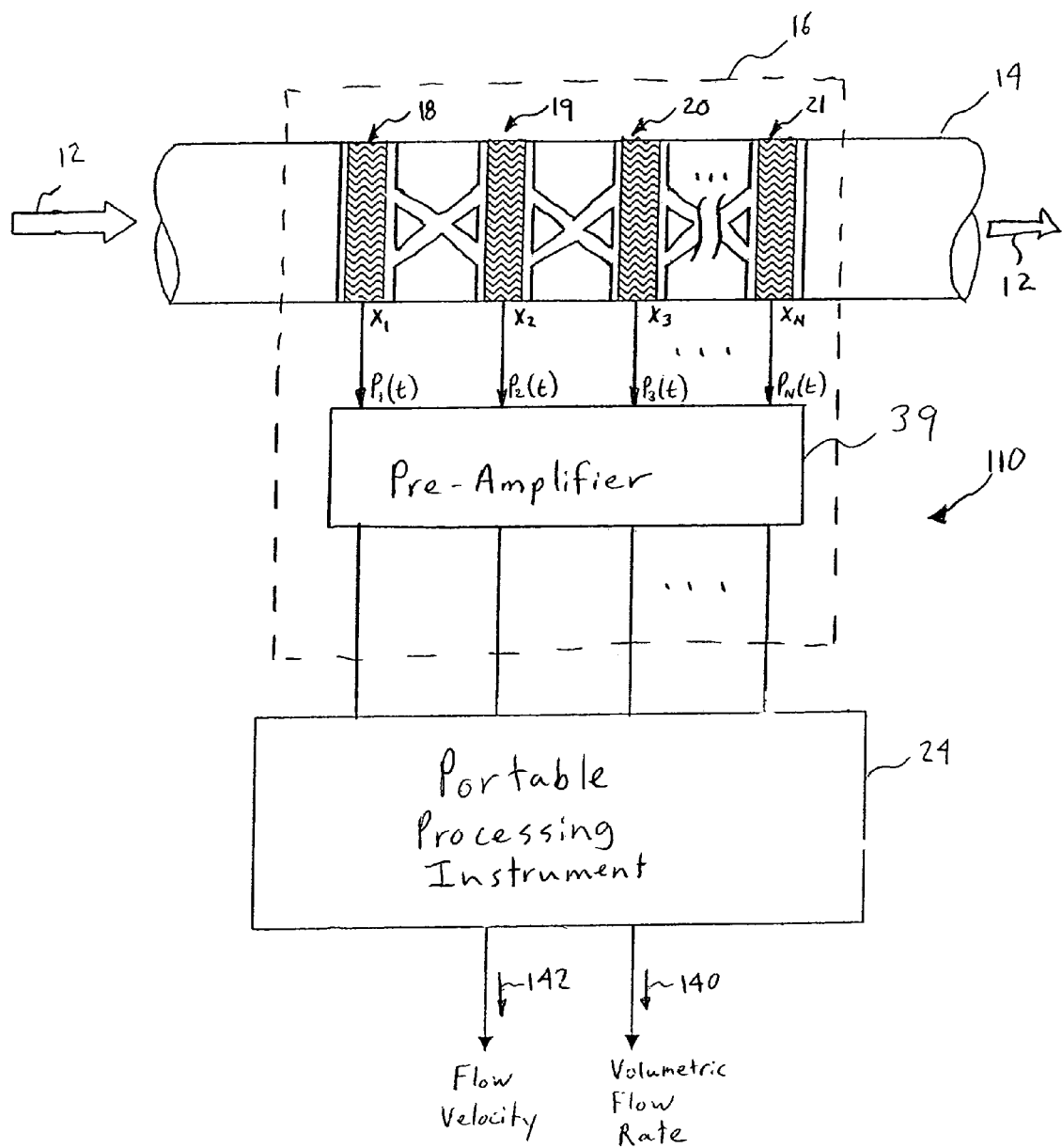
FIG. 4 is a block diagram of an apparatus for measuring the vortical field of a process flow within a pipe, in accordance with the present invention.

Referring to FIG. 4, the apparatus 110 can measure the volumetric flow rate of a single phase fluid 12 (e.g., gas and liquid) and/or a multi-phase mixture 12 (e.g., process flow) flowing through a pipe.

As discussed hereinbefore, the flow meter 10 includes a sensing unit 16 comprising an array of sensors (or transducers) 18–21 spaced axially along a pipe 14, having a process flow 12 propagating therein. The sensors measure the unsteady and/or stochastic pressures of the fluid flowing within the pipe, which are indicative of the velocity of the process flow 12. The amplified output signals ($P_1(t)$–$P_N(t)$) of the sensors 18–21 are provided to the processor 24, which processes the measurement data of the stochastic parameters to determine the flow velocity 142 and/or the volumetric flow rate 140. The measurement is derived by interpreting a stochastic parameter within the process piping using multiple sensors 18–21 displaced axially over a predetermined length.

The flow meter 10 measures the velocities associated with stochastic pressure fields associate with the vortical eddies 188 (FIG. 5) propagating with the flow 12 to determine the velocity of the flow 12. Therefore, the velocity of the unsteady pressures is related to the velocity of the flow 12 and hence the volumetric flow rate may be determined, as will be described in greater detail hereinafter.

As shown in FIG. 5, the flow meter 10 has an array of at least two sensors 18,19, located at two locations $x_1, x_2$ axially along the pipe 14. One will appreciate that the sensor array may include more than two sensors as depicted by sensors 20,21 at locations $X_3$ and $X_N$. The stochastic pressures may be measured through sensors 18–21. The sensors provide time-varying signals $P_1(t), P_2(t), P_3(t), P_N(t)$ to the portable processing instrument 24. The processor 30 calculates the Fourier transform of the time-based input signals $P_1(t)$–$P_N(t)$ and provide complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)$–$P_N(t)$, may be used.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors and retain a substantial portion of the stochastic parameter associated with the flow field and any other short wavelength (compared to the sensor spacing) low frequency stochastic parameters.

The processor 30 uses the frequency signals $P_1(\omega)$–$P_N(\omega)$ to provide a flow signal 140 indicative of the volumetric flow rate of the process flow 12 and/or a velocity signal 142 indicative of the velocity of the process flow using array processing algorithms and techniques.

One technique of determining the convection velocity of the turbulent eddies 188 within the process flow 12 is by characterizing the convective ridge of the resulting unsteady pressures using an array of sensors or other beam forming techniques, similar to that described in U.S. patent application, Ser. No. 10/007,736 and U.S. patent application, Ser. No. 09/729,994, filed Dec. 4, 200, now U.S. Pat. No. 6,609,069, which are incorporated herein by reference.

The flow metering methodology uses the convection velocity of coherent structures within pipe flows 12 to determine the volumetric flow rate. The convection velocity of the eddies 188 is determined by applying arraying processing techniques to determine the speed at which the eddies convect past the axial array of sensors distributed along the pipe 14, similar to that used in the radar and sonar fields.

The array processing algorithms determine the speed of the stochastic parameters by characterizing both the temporal and spatially frequency characteristics of the flow field. For a series of coherent eddies 188 convecting past a fixed array of sensors, the temporal and spatial frequency content of stochastic fluctuations are related through the following relationship:

$$k = \frac{\omega}{U_{convect}}$$

Here k is the wave number, defined as $k = 2\pi/\lambda$ and has units of 1/length, $\omega$ is the temporal frequency in rad/sec, and $U_{convect}$ is the convection velocity. Thus, the shorter the wavelength (larger k) is, the higher the temporal frequency.

In array processing, the spatial/temporal frequency content of time stationary sound fields are often displayed using "k-$\omega$ plots". K-$\omega$ plots are essentially three-dimensional power spectra in which the power of a sound field is decomposed into bins corresponding to specific spatial wave numbers and temporal frequencies. On a k-$\omega$ plot, the power associated with the unsteady pressure fields convecting with the flow is distributed in regions, which satisfies the dispersion relationship developed above. This region is termed "the convective ridge" (Beranek, 1992) and the slope of this ridge on a k-$\omega$ plot indicates the convective velocity of the stochastic field. This suggests that the convective velocity of eddies 188, and hence flow rate within a pipe, can be determined by constructing a k-$\omega$ plot from the output of a phased array of sensor and identifying the slope of the convective ridge.

As described hereinbefore, the apparatus 110 of FIG. 4 is based on the observation that unsteady pressures of a moving fluid vary the signal, which can be sensed by sensors 140,142, and that a eddies 188 moves at either the same velocity as the moving fluid, or at a velocity that can be correlated to the velocity of the moving fluid. The array processing can be performed by exploiting what is sometimes called the dispersion relationship associated with convective disturbances (i.e. $\omega = uk$, where $\omega$ is the angular frequency of the signal of the vortical disturbance, u is the velocity of the disturbance, and k is the wavenumber of the signal). Convective eddies 188 parameters in a flowing fluid can be viewed as parameters that are fixed to the fluid. These parameters have a spatial variation associated with them. Since the eddies can be viewed as affixed to the fluid flow, the spatial variations result in temporal variations when sensed by stationary sensors. The spatial wavelength of the stochastic parameters that move with the fluid is thereby linked to the temporal variations observed by the stationary sensors. The present invention relies on utilizing array processing techniques to identify this relationship and thereby determine the convection velocity of the fluid.

Figure 6:
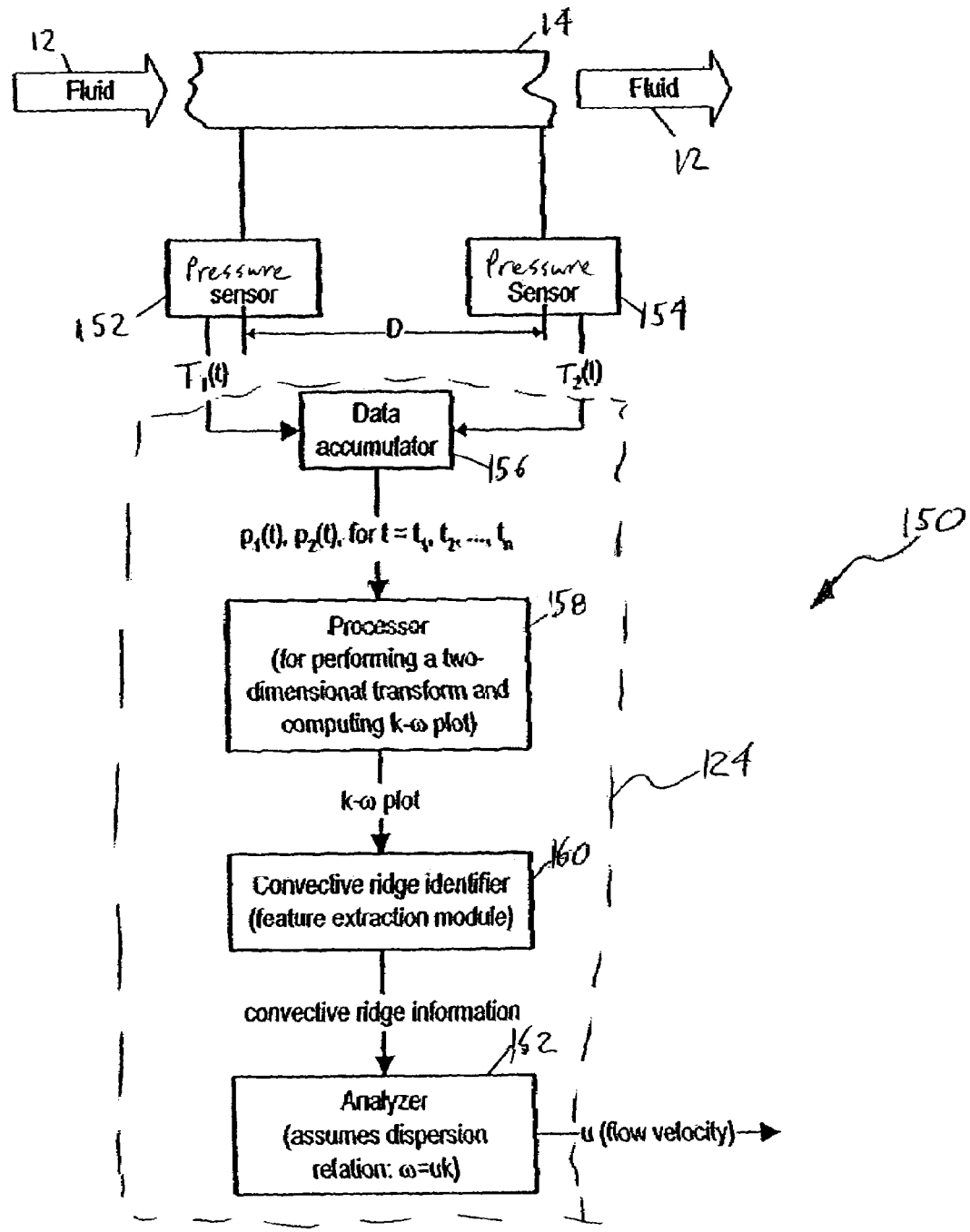
FIG. 6 is a block diagram of an apparatus for measuring the vortical field of a process flow within a pipe, in accordance with the present invention.

Referring now to FIG. 6, a portable apparatus 150, embodying the present invention, for determining a volumetric flow rate of a fluid 12 within a conduit (pipe) 14 is shown as including an array of sensors 152, 154 disposed axially along the pipe for sensing respective stochastic signals propagating between the sensors 140,142 within the pipe at their respective locations. Each sensor 18–21 provides a signal indicating an unsteady pressure at the location of each sensor, at each instant in a series of sampling instants. A data accumulator 156 accumulates the signals $P_1(t)$ and $P_2(t)$ from the sensors, and provides the data accumulated over a sampling interval to a processor 158, which performs a spatial-temporal (two-dimensional) transform of the sensor data, from the xt domain to the k-$\omega$ domain, and then calculates the power in the k-$\omega$ plane, as represented by k-$\omega$ plot.

To calculate the power in the k-$\omega$ plane, as represented by a k-$\omega$ plot (see FIG. 7) of either the signals or the differenced signals, the processor 158 determines the wavelength and so the (spatial) wavenumber k, and also the (temporal) frequency and so the angular frequency $\omega$, of various of the spectral components of the stochastic parameter. There are numerous algorithms available in the public domain to perform the spatial/temporal decomposition of arrays of sensor units 152, 154.

Figure 7:
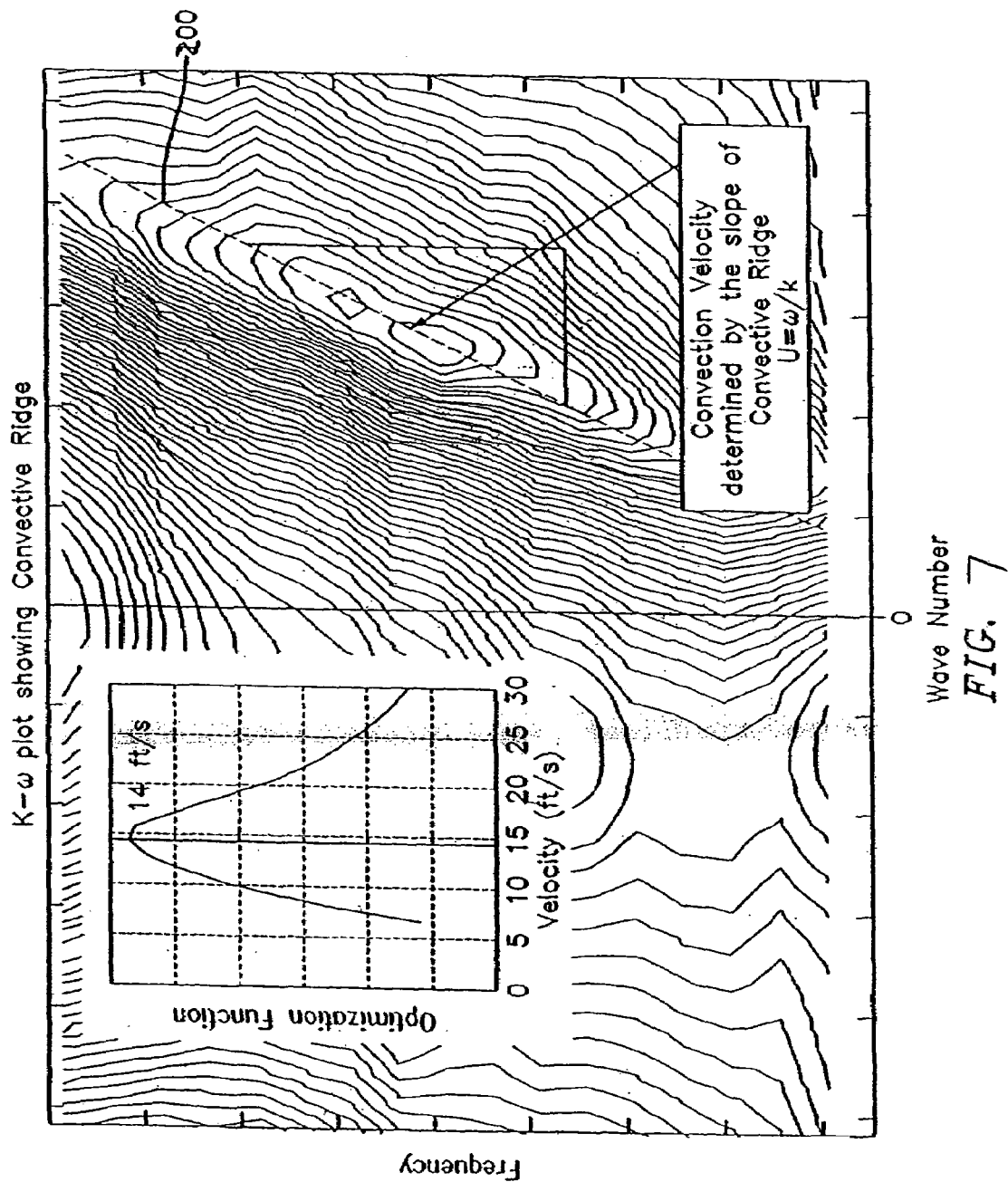
FIG. 7 a kω plot of data processed from an apparatus embodying the present invention that illustrates slope of the convective ridge, and a plot of the optimization function of the convective ridge, in accordance with the present invention.

In the case of suitable turbulent eddies 188 being present, the power in the k-$\omega$ plane shown in a k-$\omega$ plot of FIG. 7 so determined will exhibit a structure that is called a convective ridge 161. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 163 with some slope, the slope indicating the flow velocity, as is described in more detail below. The power in the k-ω plane so determined is then provided to a convective ridge identifier 160, which uses one or another feature extraction method to determine the location and orientation (slope) of any convective ridge present in the k-ω plane. Finally, information including the convective ridge orientation (slope) is used by an analyzer 162 to determine the flow velocity.

The processor 158 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 188 is distributed over a range of length scales and hence temporal frequencies.

Disturbances 188 that convect with a fluid flow 12 past the sensor array 152, 154 are transformed onto the convective ridge by the processor 158, the terminology ridge being appropriate because a k-ω plot indicates by one or another symbology the energy of k-ω pairs in the k-ω plane (i.e. the energy conveyed by the k-ω spectral component). Thus, identifying the convective ridge within the k-ω plane provides a means to determine the convective velocity. For flows within pipes, the convective velocity of the stochastic parameter is closely related to the average volumetric fluid velocity and therefore volumetric flow rate (flow velocity) within the pipe 14. While the apparatus 150 includes two sensors 152, 154, the present invention contemplates more than two sensors, such as 3 to 16 sensors in an array or more, for example.

Once the power in the k-ω plane is determined, the convective ridge identifier 160 uses one or another feature extraction methodology to discern a convective ridge 161 and its orientation in the k-ω plane. In addition to automate techniques, a convective ridge can be located using even manual, visual inspection. In the preferred embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 160 provides information about the different trial convection velocities, information referred to generally as convective ridge information. The analyzer 162 examines the convective ridge information and, assuming the straight-line dispersion relation given by equation (1), determines the flow velocity and its uncertainty.

In sensing both spatial and temporal characteristics of a wavelike phenomenon using an array of sensor units 152, 154, the spatial length scales and coherence lengths of the phenomenon constrain the length scale of the array. Thus, in the case of measuring the flow velocity by sensing vortical disturbances, sensors must be closely spaced and located within a limited axial region; for flow velocities of less than 30 ft/sec in a three-inch diameter pipe, the sensor units should usually be spaced less than 1" apart. The axial region is approximately 0.3 of the diameter of the pipe 14.

FIG. 7 shows an example of a k-ω plot generated from a phased array of pressure sensors. The power contours show a well-defined convective ridge. A parametric optimization method was used to determine the "best" line representing the slope of the convective ridge 200. For this case, a slope of 14.2 ft/sec was determined. The intermediate result of the optimization procedure is displayed in the insert, showing that optimized value is a unique and well-defined optima.

Figure 8:
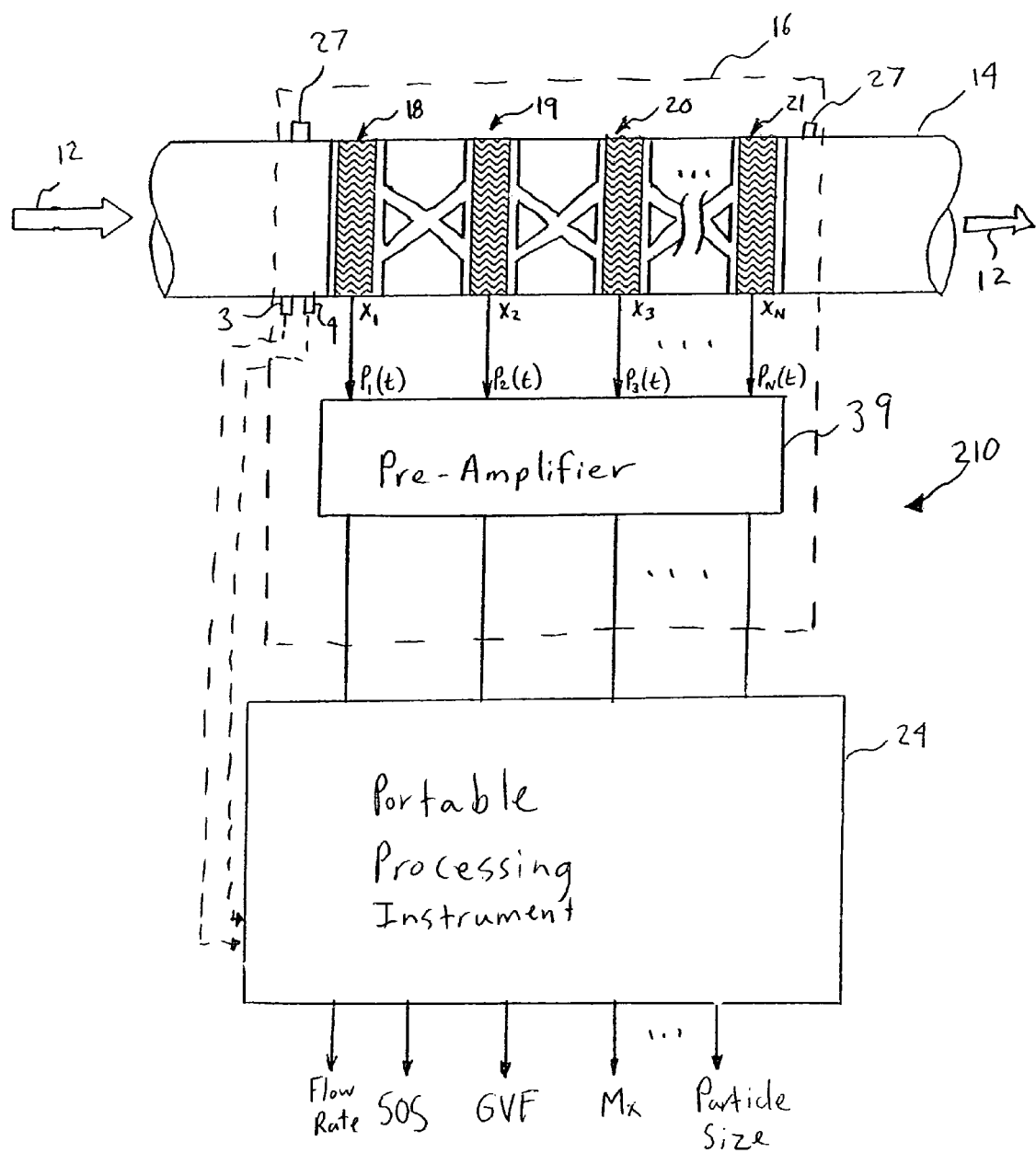
FIG. 8 is a block diagram of an apparatus for measuring the speed of sound propagating through a process flow flowing within a pipe, in accordance with the present invention.

Referring to FIG. 8, an apparatus 210 measures the speed of sound (SOS) to determine various characteristics of the fluid flow, as described hereinbefore.

The following approach may be used with any technique that measures the sound speed of a flow or speed at which sound propagates through the flow 12. However, it is particularly synergistic with flow meters using sonar-based array processing, such as described in U.S. patent application, Ser. No. 10/007,736 and U.S. patent application, Ser. No. 09/729,994, filed Dec. 4, 200, now U.S. Pat. No. 6,609,069, which are incorporated herein by reference. While the sonar-based flow meter using an array of sensors to measure the speed of sound of an acoustic wave propagating through the mixture is shown and described, one will appreciate that any means for measuring the speed of sound of the acoustic wave may used to determine the entrained gas volume fraction of the mixture/fluid.

FIG. 8 illustrates a schematic drawing of one embodiment of the present invention. The apparatus 210 includes a sensing device 16 comprising an array of pressure sensors (or transducers) 18–21 spaced axially along the outer surface 22 of a pipe 14, having a process flow propagating therein. The pressure sensors measure the unsteady pressures produced by acoustical disturbances within the pipe, which are indicative of the SOS propagating through the fluid 12. The output signals ($P_1$–$P_N$) of the pressure sensors 18–21 are provided to the processor 24, which processes the pressure measurement data and determines the speed of sound and gas volume fraction (GVF).

In an embodiment of the present invention shown in FIG. 15, the apparatus 210 has at least pressure sensors 18–21 disposed axially along the pipe 14 for measuring the unsteady pressure $P_1$–$P_N$ of the flow 12 flowing therethrough.

The apparatus 210 has the ability to measure the gas volume fraction by determining the speed of sound of acoustical disturbances or sound waves propagating through the flow 12 using the array of pressure sensors 18–21. While the apparatus of FIG. 8 shows at least four pressure sensors 18–21, the present invention contemplates an apparatus having an array of two or more pressure sensors and having as many as sixteen (16) pressure sensors.

Generally, the apparatus 210 measures unsteady pressures created by acoustical disturbances propagating through the flow 12 to determine the speed of sound (SOS) propagating through the flow. Knowing the pressure and/or temperature of the flow and the speed of sound of the acoustical disturbances, the processing unit 24 can determine the gas volume fraction of the flow (and other characteristics of the flow), as described and shown in FIG. 8.

The apparatus 210 in FIG. 8 also contemplates providing one or more acoustic sources 27 to enable the measurement of the speed of sound propagating through the flow for instances of acoustically quiet flow. The acoustic source may be a device the taps or vibrates on the wall of the pipe, for example. The acoustic sources may be disposed at the input end of output end of the array of sensors 18–21, or at both ends as shown. One should appreciate that in most instances the acoustics sources are not necessary and the apparatus passively detects the acoustic ridge provided in the flow 12. The passive noise includes noise generated by pumps, valves, motors, and the turbulent mixture itself.

The portable apparatus 10 of the present invention measures the speed of sound (SOS) of one-dimensional sound waves propagating through the mixture to determine the gas volume fraction of the mixture. It is known that sound propagates through various mediums at various speeds in such fields as SONAR and RADAR fields. The speed of sound propagating through the pipe and flow 12 may be determined using a number of known techniques, such as those set forth in U.S. patent application Ser. No. 09/344,094, entitled "Fluid Parameter Measurement in Pipes Using Acoustic Pressures", filed Jun. 25, 1999, now U.S. Pat. No. 6,354,147; U.S. patent application Ser. No. 09/729,994, filed Dec. 4, 2002, now U.S. Pat. No. 6,609,069; U.S. patent application Ser. No. 09/997,221, filed Nov. 28, 2001, now U.S. Pat. No. 6,587,798; and U.S. patent application Ser. No. 10/007,749, entitled "Fluid Parameter Measurement in Pipes Using Acoustic Pressures", filed Nov. 7, 2001, each of which are incorporated herein by reference.

As shown in FIG. 8, the portable apparatus 210 embodying the present invention has an array of at least two acoustic pressure sensors 18,19, located at three locations $X_1, X_2$ axially along the pipe 14. One will appreciate that the sensor array may include more than two pressure sensors as depicted by pressure sensor 20,21 at location $X_3, X_N$. The pressure generated by the acoustic waves may be measured through pressure sensors 18–21. The pressure sensors 18–21 provide pressure time-varying signals $P_1(t), P_2(t), P_3(t), P_N(t)$ to the portable processing instrument 24. The processor 30 calculates the Fourier transform of the time-based input signals $P_1(t)$–$P_N(t)$ and provide complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)$–$P_N(t)$, may be used. For example, the cross-spectral density and the power spectral density may be used to form a frequency domain transfer functions (or frequency response or ratios) discussed hereinafter.

The frequency signals $P_1(\omega)$–$P_N(\omega)$ are fed to an array processing unit 238 which provides a signal to line 240 indicative of the speed of sound of the mixture $a_{mix}$, discussed more hereinafter. The $a_{mix}$ signal is provided to a SOS processing unit 225, similar to the processing unit 25, which converts $a_{mix}$ to a percent composition of a mixture and provides a gas volume fraction output, as discussed hereinafter.

Similar to array processing described hereinbefore for the array processor 136 of FIG. 4 the data from the array of sensors 18–21 may be processed in any domain, including the frequency/spatial domain, the temporal/spatial domain, the temporal/wave-number domain or the wave-number/frequency (k-ω) domain. As such, any known array processing technique in any of these or other related domains may be used if desired, similar to the techniques used in the fields of SONAR and RADAR.

Figure 9:
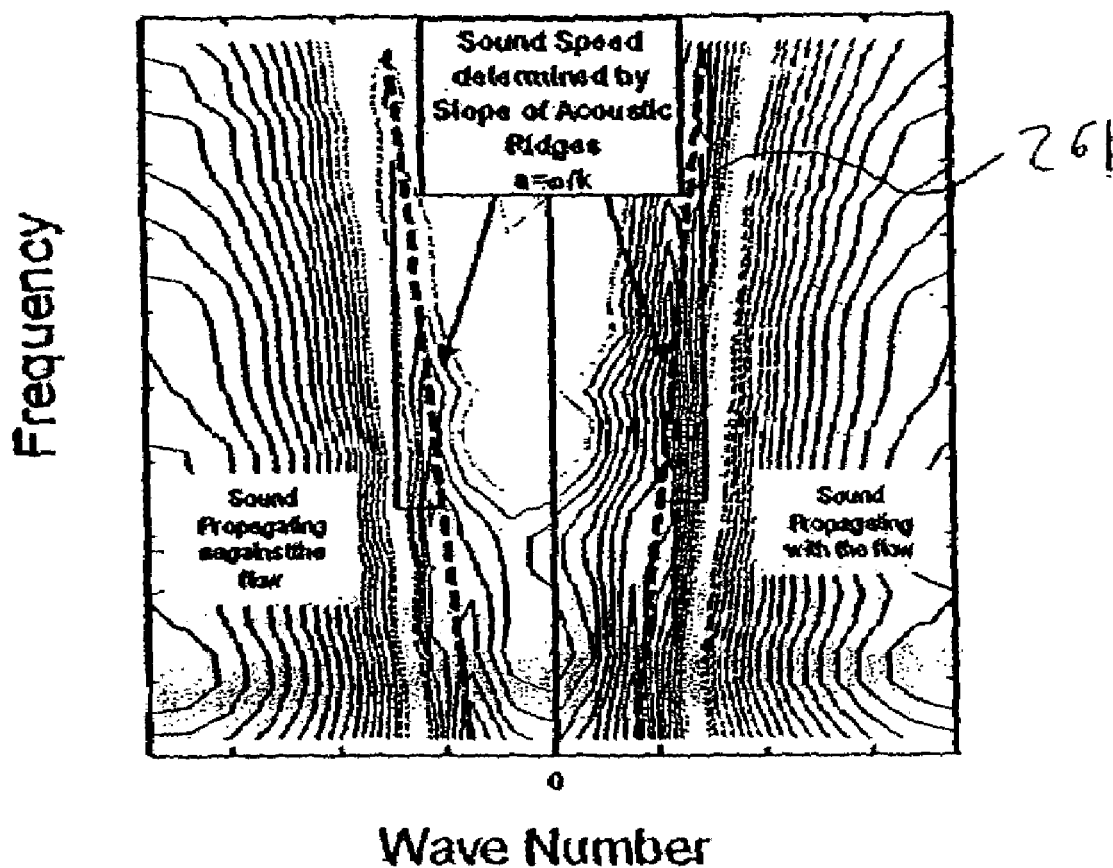
FIG. 9 a kω plot of data processed from an apparatus embodying the present invention that illustrates slope of the acoustic ridges, in accordance with the present invention.

One such technique of determining the speed of sound propagating through the flow 12 is using array processing techniques to define an acoustic ridge in the k-ω plane as shown in FIG. 9. The slope of the acoustic ridge is indicative of the speed of sound propagating through the flow 12. This technique is similar to that described in U.S. Pat. No. 6,587,798 filed Nov. 28, 2001, titled "Method and System for Determining The Speed of Sound in a Fluid Within a Conduit", which is incorporated herein by reference. The speed of sound (SOS) is determined by applying sonar araying processing techniques to determine the speed at which the one dimensional acoustic waves propagate past the axial array of unsteady pressure measurements distributed along the pipe 14.

The processor 30 performs a Fast Fourier Transform (FFT) of the time-based pressure signals $P_1(t)$–$P_N(t)$ to convert the pressure signal into the frequency domain. The power of the frequency-domain pressure signals are then determined and defined in the k-ω plane by using array processing algorithms (such as Capon and Music algorithms). The acoustic ridge in the k-ω plane, as shown in the k-ω plot of FIG. 9, is then determined. The speed of sound (SOS) is determined by measuring slope of the acoustic ridge. The gas volume fraction is then calculated or otherwise determined, as described hereinafter.

The flow meter of the present invention uses known array processing techniques, in particular the Minimum Variance, Distortionless Response (MVDR, or Capon technique), to identify pressure fluctuations, which convect with the materials flowing in a conduit and accurately ascertain the velocity, and thus the flow rate, of said material. These processing techniques utilize the covariance between multiple sensors 18–21 at a plurality of frequencies to identify signals that behave according to a given assumed model; in the case of the apparatus 210, a model, which represents pressure variations 20 convecting at a constant speed across the pressure sensors comprising the flow meter monitoring head 12.

To calculate the power in the k-ω plane, as represent by a k-ω plot (see FIG. 9) of either the pressure signals, the processor 30 determines the wavelength and so the (spatial) wavenumber k, and also the (temporal) frequency and so the angular frequency ω, of various spectral components of the acoustic waves created passively or actively within the pipe. There are numerous algorithms available in the public domain to perform the spatial/temporal decomposition of arrays of sensor units 18–21.

In the case of suitable acoustic pressures being present, the power in the k-ω plane shown in a k-ω plot of FIG. 9 so determined will exhibit a structure that is called an acoustic ridge 261 associated with sound propagating with the flow and one associated with sound propagating against the flow. The acoustic ridge represents the concentration of the disturbances that propagate with and against the flow and is a mathematical manifestation of the relationship between the spatial variations and temporal variations described above. Such a plot will indicate a tendency for k-ω pairs to appear more or less along a line with some slope, the slope indicating the speed of sound traveling in both directions, as is described in more detail below. The power in the k-ω plane so determined is then provided to a acoustic ridge identifier, which uses one or another feature extraction method to determine the location and orientation (slope) of any acoustic ridge present in the k-ω plane. Finally, information including the acoustic ridge orientation (slope) is used by an analyzer to determine the speed of sound.

The processor 30 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

Also, some or all of the functions within the processor 30 may be implemented in software (using a microprocessor or computer) and/or firmware, or may be implemented using analog and/or digital hardware, having sufficient memory, interfaces, and capacity to perform the functions described herein.

In one embodiment as shown in FIG. 1, each of the pressure sensors 18–21 include a piezoelectric film 50 attached to a unitary multi-band strap 52 to measure the unsteady pressures of the flow 12 using either technique described hereinbefore. The piezoelectric film sensors 18–21 are mounted onto a unitary substrate or web 52 which is mounted or clamped onto the outer surface 22 of the pipe 14, which will described in greater detail hereinafter.

The piezoelectric film sensors 18–21 include a piezoelectric material or film 50 to generate an electrical signal proportional to the degree that the material is mechanically deformed or stressed. The piezoelectric sensing element 50 is typically conformed to allow complete or nearly complete circumferential measurement of induced strain to provide a circumferential-averaged pressure signal. The sensors can be formed from PVDF films, co-polymer films, or flexible PZT sensors, similar to that described in "Piezo Film Sensors Technical Manual" provided by Measurement Specialties, Inc., which is incorporated herein by reference. A piezoelectric film sensor that may be used for the present invention is part number 1-1002405-0, LDT4-028K, manufactured by Measurement Specialties, Inc. While the piezoelectric film material 50 is provided substantially the length of the band 44, and therefore the circumference of the pipe 14, the present invention contemplates that the piezoelectric film material may be disposed along a portion of the band of any length less than the circumference of the pipe.

Piezoelectric film ("piezofilm") 50, like piezoelectric material, is a dynamic material that develops an electrical charge proportional to a change in mechanical stress. Consequently, the piezoelectric material measures the strain induced within the pipe 14 due to unsteady or stochastic pressure variations (e.g., vortical and/or acoustical) within the process flow 12. Strain within the pipe is transduced to an output voltage or current by the attached piezoelectric sensor 18–21. The piezoelectrical material or film 50 may be formed of a polymer, such as polarized fluoropolymer, polyvinylidene fluoride (PVDF). The piezoelectric film sensors are similar to that described in U.S. patent application Ser. No. 10/712,818, filed Nov. 12, 2003 and U.S. patent application Ser. No. 10/795,111, filed Mar. 4, 2004, which are incorporated herein by reference. The advantages of this clamp-on technique using piezoelectric film include non-intrusive flow rate measurements, low cost, measurement technique requires no excitation source. One will appreciate that the sensor may be installed or mounted to the pipe 14 as individual sensors or all the sensors mounted as a single unit as shown in FIG. 1.

The pressure sensors 18–21 of FIG. 1 described herein may be any type of sensor, capable of measuring the unsteady (or ac or dynamic) pressures or parameter that convects with the flow within a pipe 14, such as piezoelectric, optical, capacitive, resistive (e.g., Wheatstone bridge), accelerometers (or geophones), velocity measuring devices, displacement measuring devices, ultra-sonic devices, etc. If optical pressure sensors are used, the sensors 18–21 may be Bragg grating based pressure sensors, such as that described in U.S. patent application, Ser. No. 08/925,598, entitled "High Sensitivity Fiber Optic Pressure Sensor For Use In Harsh Environments", filed Sep. 8, 1997, now U.S. Pat. No. 6,016,702, and in U.S. patent application, Ser. No. 10/224,821, entitled "Non-Intrusive Fiber Optic Pressure Sensor for Measuring Unsteady Pressures within a Pipe", which are incorporated herein by reference. In an embodiment of the present invention that utilizes fiber optics as the pressure sensors 14 they may be connected individually or may be multiplexed along one or more optical fibers using wavelength division multiplexing (WDM), time division multiplexing (TDM), or any other optical multiplexing techniques.

In certain embodiments of the present invention, a piezoelectronic pressure transducer may be used as one or more of the pressure sensors 18–21 and it may measure the unsteady (or dynamic or ac) pressure variations inside the pipe 14 by measuring the pressure levels inside of the pipe. These sensors may be ported within the pipe to make direct contact with the process flow 12. In an embodiment of the present invention, the sensors comprise pressure sensors manufactured by PCB Piezotronics. In one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems.

It is also within the scope of the present invention that any strain sensing technique may be used to measure the variations in strain in the pipe, such as highly sensitive piezoelectric, electronic or electric, strain gages and piezo-resistive strain gages attached to the pipe 12. Other strain gages include resistive foil type gages having a race track configuration similar to that disclosed U.S. patent application Ser. No. 09/344,094, filed Jun. 25, 1999, now U.S. Pat. No. 6,354,147, which is incorporated herein by reference. The invention also contemplates strain gages being disposed about a predetermined portion of the circumference of pipe 12. The axial placement of and separation distance $\Delta X_1$, $\Delta X_2$ between the strain sensors are determined as described herein above.

It is also within the scope of the present invention that any other strain sensing technique may be used to measure the variations in strain in the pipe, such as highly sensitive piezoelectric, electronic or electric, strain gages attached to or embedded in the pipe 14.

While the description has described the apparatus as two separate meters that measure the vortical disturbances and the speed of sound, respectively, as suggested by FIG. 1, the processing could function as two separate meters, a combination (simultaneous operation) of both function, or selectively chose between operations.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. A portable flow measurement device for measuring a parameter of a process flow flowing within a pipe, the device comprising:
   a sensor, wherein the sensor provides a signal indicative of a characteristic of the process flow flowing within the pipe; and
   a portable processing instrument, responsive to said signal, which provides an output signal indicative of the at least one parameter of the process flow flowing through the pipe, said portable processing instrument having a user interface enabling a user to diagnose the operation of the flow measurement device by modifying the processing of the portable processing instrument.

2. The portable flow measurement device of claim 1, wherein the portable processing instrument includes a user interface to-enable a user to modify the operation of the portable flow measurement.

3. The portable flow measurement device of claim 1, wherein the portable processing instrument includes a processor and a user interface to enable a user to modify a parameter within the processor.

4. The portable flow measurement device of claim 1, wherein the parameter of the fluid is one of steam quality or "wetness", vapor/mass ratio, liquid/solid ratio, volumetric flow rate, mass flow rate, size of suspended particles, density, gas volume fraction, and enthalpy of the flow.

5. The portable flow measurement device of claim 1, wherein the portable processing instrument includes a processor that determines the volumetric flow rate of the fluid flowing in the pipe in response to the velocity of the fluid.

6. The portable flow measurement device of claim 1, wherein the sensor includes at least two pressure sensors, wherein the pressure sensors provide respective pressure signals indicative of the unsteady pressure within the pipe.

7. The portable flow measurement device of claim 6, wherein the at least two pressure sensors include one of 3, 4, 5, 6, 7, 8, 9, 10, 11, 12, 13, 14, 15, 16, 17, 18, 19 and 20 pressure sensors.

8. The portable flow measurement device of claim 6, wherein the at least two pressure sensors are removably attached to the outer surface of the pipe.

9. The portable flow measurement device of claim 6, wherein the portable processing instrument includes a signal processing unit for filtering the pressure signals.

10. The portable flow measurement device of claim 6, wherein the portable processing instrument includes a data acquisition unit for digitizing the pressure signals.

11. The portable flow measurement device of claim 6, wherein the portable processing instrument includes a processor to determine a parameter of the process flow in response to an array processing algorithm.

12. The portable flow measurement device of claim 11, wherein the portable processing instrument includes a user interface to enable a user to modify the array processing algorithm of the processor.

13. The portable flow measurement device of claim 6, further includes a pre-amplifier unit to adjust the gain of output signals of the pressure sensors.

14. The portable flow measurement device of claim 6, wherein the pressure signals are indication of acoustic pressures propagating through the process fluid within the pipe.

15. The portable flow measurement device of claim 6, wherein the portable processing instrument includes a processor that determines the slope of an acoustic ridge in the k-ω plane to determine a parameter of the process flow flowing in the pipe.

16. The portable flow measurement device of claim 6, wherein the pressure signals are indication of vortical disturbances within the fluid flow.

17. The portable flow measurement device of claim 16, wherein the parameter of the fluid flow is one of velocity of the process flow and the volumetric flow of the process fluid.

18. The portable flow measurement device of claim 6, wherein the portable processing instrument includes a processor that determines the slope of a convective ridge in the k-ω plane to determine the velocity of the fluid flowing in the pipe.

19. The portable flow measurement device of claim 6, wherein the portable processing instrument includes a processor that generates a flow velocity signal indicative of the velocity of the fluid flowing within the pipe by cross-correlating the pressure signals.

* * * * *